June 9, 1959  F. K. H. NALLINGER  2,890,326
LICENSE PLATE ILLUMINATOR
Filed Nov. 16, 1953
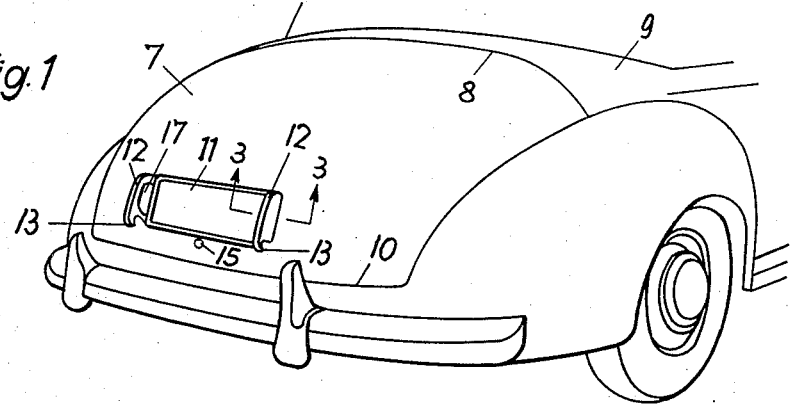
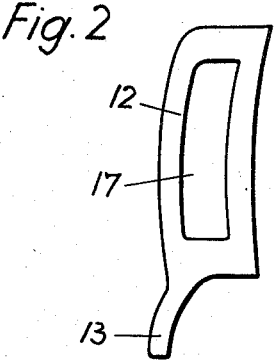
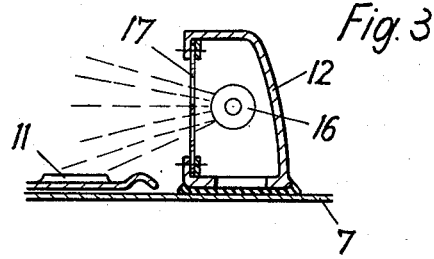
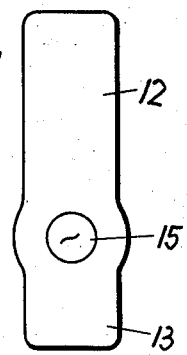
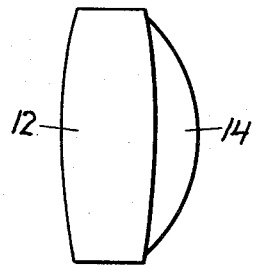
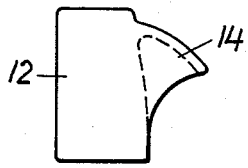
INVENTOR.
FRIEDRICH K.H. NALLINGER.
BY *Dicke and Craig*.
ATTORNEYS.

United States Patent Office 2,890,326
Patented June 9, 1959

2,890,326
LICENSE PLATE ILLUMINATOR

Friedrich K. H. Nallinger, Stuttgart, Germany, assignor to Daimler-Benz Aktiengesellschaft, Stuttgart-Unterturkheim, Germany Application November 16, 1953, Serial No. 404,457

Claims priority, application Germany November 14, 1952

4 Claims. (Cl. 240—8.3)

The invention relates to a luggage compartment door for motor vehicles, with a license plate and means, arranged on the door, for directly illuminating said license plate.

It is one object of the invention to provide such a door, in a simple manner, with a handle for lifting same.

It is another object of the invention, to shape that handle in such a way that it may easily be manufactured and fixed to the door.

According to the invention the handle forms part of the illuminating device for the license plate, especially part of the casing in which the light source of that device is lodged. For example, the casing of the illuminating device may be provided with a trigger-shaped extension on one of its narrow edges or with a shell-shaped enlargement on one of its broadsides. A further perfection of the invention may be accomplished by arranging in the casing of the illuminating device a lock for fastening the door to the immovable part of the body wall.

The accompanying drawing demonstrates several embodiments of the invention.

Fig. 1 shows the rear of a motor vehicle with an arrangement according to the invention, Fig. 2 an illuminating device with a handle in elevation, Fig. 3 a partial cross-section on the line 3—3 of Fig. 1, Fig. 4 a top view of an illuminating device with a lock installed therein, Fig. 5 a top view of a modified illuminating device, and Fig. 6 a front view of the device shown in Fig. 5.

The door 7 of a luggage compartment in the rear of a vehicle body is articulated to the immovable part 9 of the body wall by hinges arranged near the front edge 8 of the door beneath the body wall and, therefore, not visible in the drawing. A license plate 11 is fastened to the door 7 near the rear end thereof. The plate 11 is illuminated at night by light sources 16, such as electric bulbs, lodged in casings 12 arranged on both sides of the plate and provided with windows 17 on their inner sides for the passage of the light rays. According to the invention the casings 12 are provided with extensions 13 and 14 respectively, forming an integral part of the casings and each moulded as a handle for lifting the door 7 to give access to the luggage compartment. In Figs. 1 to 4 said handle 13 is formed by a trigger-shaped extension on the lower narrow edge of the casing. The handle facilitates lifting of the door by hooking one finger in it. In Figs. 5 and 6 the handle 14 is formed by a shell-shaped enlargement on the outer broadside of the casing 12. With this arrangement, lifting of the door is accomplished by setting several fingertips simultaneously in the shell. By means of the above handles the door 7, whose weight may be compensated by springs in a well known manner, may easily be lifted after it is unlocked.

The locking of the door is either done as illustrated in Fig. 1 by a Yale lock 15 or by any other known locking device inserted in the wall of the door; or the lock 15 may be installed in one of the casings 12 corresponding to Fig. 4. In the latter case a special mounting of the lock on the finished door is saved.

What I claim is:

1. On the luggage compartment door of a motor vehicle in combination a license plate of substantially rectangular shape being mounted directly on said compartment door and at essentially the horizontal center thereof, means on both sides of said license plate for directly illuminating said license plate, said means consisting each of a light source arranged in a casing, said casings being substantially rectangular in cross section in a plane substantially parallel to the outer contour of said compartment door and being mounted directly thereon in such a manner that the longer sides thereof are disposed adjacent to the shorter sides of the license plate, each said casing further including a handle-shaped projection arranged at one of the edges farthest away from said compartment door for lifting said door, each of said light sources being disposed in a vertical direction and extending essentially over the entire width of said license plate.

2. A combination acocrding to claim 1, wherein said handle-shaped projection is trigger shaped.

3. A combination according to claim 1, wherein said handle-shaped projection is shell shaped.

4. A combination according to claim 1 further comprising a lock for fastening said door to the immovable part of the vehicle wall, said lock being inserted in the casing of said illuminating means.

References Cited in the file of this patent

UNITED STATES PATENTS

| | | |
|---|---|---|
| 1,732,673 | Coquille | Oct. 22, 1929 |
| 2,054,919 | Anibal | Sept. 22, 1936 |
| 2,115,555 | Kaupert | Apr. 26, 1938 |
| 2,241,647 | Simon | May 13, 1941 |
| 2,562,740 | Rizer | July 31, 1951 |
| 2,577,982 | Traum | Dec. 11, 1951 |
| 2,628,304 | Boyd | Feb. 10, 1953 |
| 2,689,948 | Rothman | Sept. 21, 1954 |